(12) United States Patent
Chen et al.

(10) Patent No.: US 11,307,676 B2
(45) Date of Patent: Apr. 19, 2022

(54) LIGHT-BEAM EMITTER AND DISPLAY DEVICE

(71) Applicant: Shenzhen China Star Optoelectronics Semiconductor Display Technology Co., Ltd., Guangdong (CN)

(72) Inventors: Lixuan Chen, Guangdong (CN); Miao Jiang, Guangdong (CN); Xin Zhang, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 38 days.

(21) Appl. No.: 16/963,264

(22) PCT Filed: Jul. 9, 2020

(86) PCT No.: PCT/CN2020/101000
§ 371 (c)(1),
(2) Date: Jul. 20, 2020

(87) PCT Pub. No.: WO2021/217882
PCT Pub. Date: Nov. 4, 2021

(65) Prior Publication Data
US 2021/0357038 A1 Nov. 18, 2021

(30) Foreign Application Priority Data
Apr. 29, 2020 (CN) .......................... 202010357930.8

(51) Int. Cl.
*G06F 3/033* (2013.01)
*G06F 3/03* (2006.01)
(Continued)

(52) U.S. Cl.
CPC .......... *G06F 3/0304* (2013.01); *G06F 3/0202* (2013.01); *G06F 3/038* (2013.01); *G06F 3/0346* (2013.01)

(58) Field of Classification Search
None
See application file for complete search history.

(56) References Cited

U.S. PATENT DOCUMENTS

| | | | | |
|---|---|---|---|---|
| 2002/0025062 A1* | 2/2002 | Black | ...................... | G07C 9/37 382/116 |
| 2007/0048065 A1* | 3/2007 | Schmidt | .................... | B43L 1/02 401/109 |

(Continued)

FOREIGN PATENT DOCUMENTS

| CN | 202331788 | 7/2012 |
|---|---|---|
| CN | 102707795 | 10/2012 |
| CN | 105677065 | 6/2016 |

*Primary Examiner* — Carl Adams (57) ABSTRACT

A light-beam emitter and a display device are provided. The light-beam emitter includes a main body, and a light-emitting assembly, a projection button, an operation button, and a control assembly disposed on the main body; wherein the control assembly is connected to the projection button, the operation button, and the light-emitting assembly, the control assembly is configured to control the light-emitting assembly to emit a projection beam when the projection button is pressed, and the control assembly is configured to control the light-beam emitter to perform a corresponding operation when the operation button is pressed.

17 Claims, 7 Drawing Sheets

(51) Int. Cl.
*G06F 3/02* (2006.01)
*G06F 3/0346* (2013.01)
*G06F 3/038* (2013.01)

(56) References Cited

U.S. PATENT DOCUMENTS

| | | | |
|---|---|---|---|
| 2009/0073116 A1* | 3/2009 | Horiuchi | G06F 3/042 |
| | | | 345/157 |
| 2013/0187853 A1 | 7/2013 | Yuan et al. | |
| 2018/0095552 A1 | 4/2018 | Li et al. | |
| 2020/0092523 A1 | 3/2020 | Peuhkurinen | |

* cited by examiner

LIGHT-BEAM EMITTER AND DISPLAY DEVICE

RELATED APPLICATIONS

This application is a National Phase of PCT Patent Application No. PCT/CN2020/101000 having International filing date of Jul. 9, 2020, which claims the benefit of priority of Chinese Patent Application No. 202010357930.8 filed on Apr. 29, 2020. The contents of the above applications are all incorporated by reference as if fully set forth herein in their entirety.

FIELD AND BACKGROUND OF THE INVENTION

The present application relates to the field of display technologies, and in particular to a light-beam emitter and a display device.

Nowadays, display panels are widely used in various fields of society, in which people's demand for interactive display technology is increasing day by day. At present, there is an interactive technology that can achieve precise remoteness in the industry, mainly by integrating a photosensitive device into a display panel, using a beam emitted by a light-beam emitter as a control source, and identifying the beam through the photosensitive device to achieve remote operation.

However, when the beam projected by the light-beam emitter can be positioned on the display panel and a projection pattern is revealed, how to conveniently realize an interaction between the light-beam emitter and the display panel has become a problem to be solved in this field.

Technical Problem

How to conveniently realize the interaction between the light-beam emitter and the display panel.

SUMMARY OF THE INVENTION

Technical Solution

In a first aspect, an embodiment of the present application provides a light-beam emitter to solve a technical problem of how to conveniently realize the interaction between a light-beam emitter and a display panel.

The technical solutions provided in the present application are as follows.

A light-beam emitter, including:
a main body;
a light-emitting assembly disposed on the main body;
a projection button and an operation button disposed on the main body; and
a control assembly disposed on the main body;
wherein the control assembly is connected to the projection button, the operation button, and the light-emitting assembly, the control assembly is configured to control the light-emitting assembly to emit a projection beam when the projection button is pressed, and the control assembly is configured to control the light-beam emitter to perform a corresponding operation when the operation button is pressed.

In some embodiments, when the operation button is pressed, the control assembly controls the light-emitting assembly to emit an operation beam, and the projection beam is different from the operation beam.

In some embodiments, the control assembly controls the light-emitting assembly to emit a first operation beam when the operation button is pressed a single time within a preset time, and the first operation beam is different from the projection beam.

In some embodiments, the control assembly controls the light-emitting assembly to emit a second operation beam when the operation button is continuously pressed at least twice within the preset time, and the second operation beam, the first operation beam, and the projection beam are all different from each other.

In some embodiments, the light source assembly includes a first light source and a second light source, the first light source is configured to emit the first operation beam, and the second light source is configured to emit the second operation beam.

In some embodiments, the light-emitting assembly includes a light source and a filter disposed on a light-exiting side of the light source, and the filter is connected to the main body by rotating around its central axis.

In some embodiments, the light-beam emitter further including a first communication module disposed on the main body, wherein the control assembly is connected to the first communication module, the control assembly is further configured to control the first communication module to transmit an operation signal when the operation button is pressed.

In some embodiments, the control assembly controls the first communication module to transmit a first operation signal when the operation button is pressed a single time within a preset time; and when the operation button is continuously pressed at least twice within the preset time, the control assembly controls the first communication module to transmit a second operation signal, and the second operation signal is different from the first operation signal.

In some embodiments, the light-beam emitter further including a gyroscope positioner disposed on the main body.

In some embodiments, the light-beam emitter further including a pressure sensing button and a pressure sensing assembly disposed on the main body, wherein the pressure sensing assembly and the pressure sensing button are connected to the control assembly, the pressure sensing assembly is configured to deliver a pressure signal to the control assembly when the pressure sensing button is pressed, and the control assembly controls the light-beam emitter to perform the corresponding operation according to the pressure signal.

In some embodiments, the pressure sensing assembly sends a first pressure signal to the control assembly when the pressure sensing button is pressed by a first pressure, and the pressure sensing assembly sends a second pressure signal to the control assembly when the sensing button is pressed by a second pressure.

In some embodiments, the control assembly controls the light-emitting assembly to emit a third operation beam when the pressure sensing button is pressed by the first pressure, the control assembly controls the light-emitting assembly to emit a fourth operation beam when the pressure sensing button is pressed by the second pressure, and the projection beam, the third operation beam, and the fourth operation beam are all different from each other.

In some embodiments, the light-beam emitter further including a second communication module disposed on the main body, wherein the second communication module and the control assembly are connected to the pressure sensing assembly, the control assembly is configured to control the second communication module to transmit an operation signal when the operation button is pressed; and wherein the control assembly controls the second communication module to transmit a third operation signal when the pressure sensing button is pressed by the first pressure, and the control assembly controls the second communication module to transmit a fourth operation signal when the pressure sensing button is pressed by the second pressure.

In a second aspect, the present application further provides a display device, the display device including a display panel and a light-beam emitter, wherein the display panel includes a display screen and a photosensitive device configured to sense a projected beam projected on the display panel by the light-beam emitter, wherein the light-beam emitter includes:

a main body;
a light-emitting assembly disposed on the main body;
a projection button and an operation button disposed on the main body; and
a control assembly disposed on the main body;

wherein the control assembly is connected to the projection button, the operation button, and the light-emitting assembly, the control assembly is configured to control the light-emitting assembly to emit a projection beam when the projection button is pressed, and the control assembly is configured to control the light-beam emitter to perform a corresponding operation when the operation button is pressed.

In some embodiments, the light-beam emitter includes a communication module, the display panel is communicatively connected to the communication module and is configured to receive an operation signal transmitted by the communication module, and performs a corresponding operation according to the operation signal.

In some embodiments, when the operation button is pressed, the control assembly controls the light-emitting assembly to emit an operation beam, and the projection beam is different from the operation beam.

In some embodiments, the projection beam is different from the operation beam in one or more of intensity, wavelength, beam cross-sectional size, and frequency.

In some embodiments, the control assembly controls the light-emitting assembly to emit a first operation beam when the operation button is pressed a single time within a preset time, and the first operation beam is different from the projection beam.

In some embodiments, the control assembly controls the light-emitting assembly to emit a second operation beam when the operation button is continuously pressed at least twice within the preset time, and the second operation beam, the first operation beam, and the projection beam are all different from each other.

In some embodiments, the light source assembly includes a first light source and a second light source, the first light source is configured to emit the first operation beam, and the second light source is configured to emit the second operation beam.

Beneficial Effect

When you need to operate the display panel, press the projection button, the light-beam emitter emits a projection beam, and the projection beam is projected onto the display panel and is sensed by the photosensitive device on the display panel. Therefore, after positioning a projection position of the projection beam on the display panel, press the operation button and the pressure sensing button, the light-beam emitter emits an optical signal or other signals to the display panel, and the display panel performs a corresponding operation on the projection position of the projection beam, for example, confirm operation, handwriting operation, drag light spot, change pen strokes, and other operations of the display, so as to realize the interaction between the light-beam emitter and the display panel conveniently and quickly.

BRIEF DESCRIPTION OF THE SEVERAL VIEWS OF THE DRAWINGS

The technical solutions and other beneficial effects of the present application will be apparent through the detailed description of the specific embodiment of the present application in conjunction with the accompanying drawings.

REFERENCE NUMBERS 10, light-beam emitter; 11, main body; 12, light-emitting assembly; 121, power supply; 122, light source; 122a, first light source; 122b, second light source; 123, filter; 13, control assembly; 14, projection button 15, operation button;

161, first communication module; 162, second communication module; 17, gyroscope positioner; 18, pressure sensing button; 19, pressure sensing assembly; 20, display panel; 21, display screen; 22, photosensitive device; and 30, projection beam.

DESCRIPTION OF SPECIFIC EMBODIMENTS OF THE INVENTION

The following description of each embodiment, with reference to the accompanying drawings, is used to exemplify specific embodiments which may be carried out in the present invention. Directional terms mentioned in the present invention, such as "top", "bottom", "front", "back", "left", "right", "inside", "outside", "side", etc., are only used with reference to the orientation of the accompanying drawings. Therefore, the used directional terms are intended to illustrate, but not to limit, the present invention. In the drawings, components having similar structures are denoted by the same numerals.

The present application is directed to a technical problem of how to conveniently realize the interaction between a light-beam emitter and a display panel in a conventional display device.

First Embodiment

Figure 1:
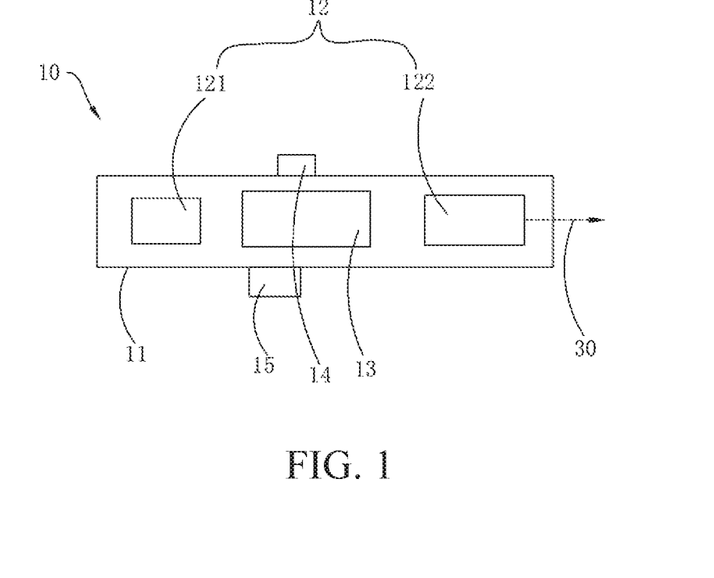
FIG. 1 is a schematic diagram of a first structure of a light-beam emitter according to a first embodiment of the present application.

A light-beam emitter, as shown in FIG. 1, the light-beam emitter 10 includes a main body 11, a light-emitting assembly 12 disposed on the main body 11, a projection button 14 and an operation button 15 disposed on the main body 11, and a control assembly 13 disposed on the main body 11.

Specifically, the light-emitting assembly 12 includes a light source 122 and a power source 121 connected to the light source 122. The light source 122 is configured to emit a beam, and the beam emitted by the light source 122 can be a laser.

Specifically, the projection button 14 is configured to control the light-emitting assembly 12 to emit a projection beam 30 for marking an input position on a display panel 20. When the projection button 14 is pressed, the light-emitting assembly 12 emits the projection beam 30. After releasing the projection button 14, the light-emitting assembly 12 stops emitting the projection beam 30.

Specifically, the control assembly 13 is connected to the projection button 14, the operation button 15, and the light-emitting assembly 12. The control assembly 13 is configured to control the light-emitting assembly 12 to emit the projection beam 30 when the projection button 14 is pressed, and the control assembly is configured to control the light-beam emitter 10 to perform a corresponding operation when the operation button 15 is pressed.

It should be noted that when the display panel 20 needs to be operated, the projection button 14 is pressed, and the light-beam emitter 10 emits the projection beam 30, which is projected onto the display panel 20 and is sensed by a photosensitive device 22 on the display panel 20. Therefore, after positioning a projection position of the projection beam 30 on the display panel 20, press the operation button 15, the light-beam emitter 10 emits an optical signal or other signals to the display panel 20, and the display panel 20 performs a corresponding operation on the projection position of the projection beam 30, for example, confirm operation, handwriting operation, drag light spot, change pen strokes, and other operations of the display, so as to realize the interaction between the light-beam emitter 10 and the display panel 20 conveniently and quickly.

Figure 2:
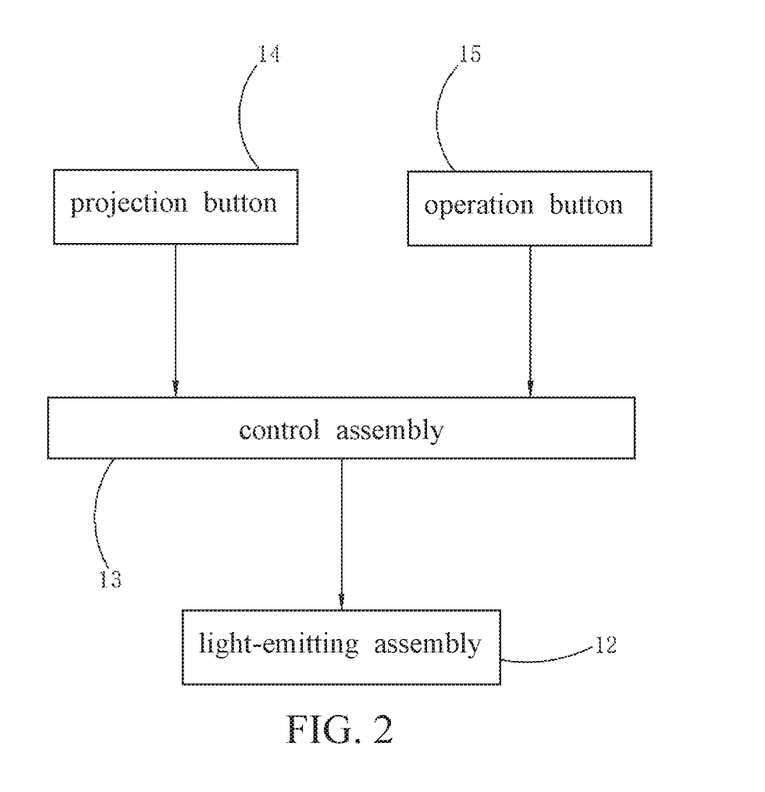
FIG. 2 is a schematic diagram of a composition module of the light-beam emitter according to the first embodiment of the present application.

As shown in FIG. 1 and FIG. 2, when the operation button 15 is pressed, the light-beam emitter 10 emits an optical signal to the display panel 20 to perform a corresponding operation on the display panel 20.

Specifically, when the operation button 15 is pressed, the control assembly 13 controls the light-emitting assembly 12 to emit an operation beam, and the projection beam 30 is different from the operation beam, that is, the projection beam 30 and the operation beam are not same.

It should be noted that when the display panel 20 needs to be operated, the projection button 14 is pressed, the control assembly 13 sends a projection signal to the light-emitting assembly 12 and controls the light-emitting assembly 12 to emit the projection beam 30, and the projection beam 30 is projected on a position of the display panel 20 to be operated. After the operation button 15 is pressed, the control assembly 13 sends a control signal to the light-emitting assembly 12 and controls the light-emitting assembly 12 to emit an operation beam to the display panel 20. After the photosensitive device 22 on the display panel 20 senses the operation beam different from the projection beam 30, the display panel 20 performs a corresponding operation on a projection position of the projection beam 30, which is convenient and simple to operate.

It should be noted that the projection beam 30 is a positioning beam, which is configured to position a point on the display panel 20 that needs to be manipulated, that is, to mark an input position on the display panel 20, and the projection beam 30 is visible light, which is convenient for human eyes to see a position where the projection beam 30 is projected on the display panel 20. The operation beam is a trigger beam for performing corresponding operations on the display panel 20. The operation beam can be visible light or invisible light. The projection beam 30 and the operation beam can be laser beams or beams formed by focusing scattered light. The projection beam 30 and the operation beam can be red beams, yellow beams, blue beams, green beams, or other color beams.

It should be noted that the projection beam 30 is different from the operation beam in one or more of intensity, wavelength, beam cross-sectional size, and frequency.

Specifically, when the operation button 15 is pressed a single time within a preset time, the control assembly 13 controls the light-emitting assembly 12 to emit a first operation beam, the first operation beam is different from the projection beam 30.

Furthermore, when the operation button 15 is continuously pressed at least twice within the preset time, the control assembly 13 controls the light-emitting assembly 12 to emit a second operation beam, the second operation beam, the first operation beam, and the projection beam 30 are all different from each other.

It should be noted that when the operation button 15 is pressed a single time and the operation button 15 is continuously pressed multiple times within the preset time, the light-beam emitter 10 emits the first operation beam and the second operation beam, respectively. The photosensitive device 22 on the display panel 20 performs different operations when sensing the first operation beam and the second operation beam. For example, the photosensitive device 22 performs a confirmation operation when sensing the first operation beam, and the photosensitive device 22 performs an open menu operation when sensing the second operation beam. Therefore, the light-beam emitter 10 realizes a function similar to that of a mouse, and does not require an operation plane support like a mouse pad, and the operation is simple and convenient.

It should be noted that the projection beam 30, the first operation beam, and the second operation beam are different from each other in one or more of intensity, wavelength, beam cross-sectional size, and frequency.

Figure 3:
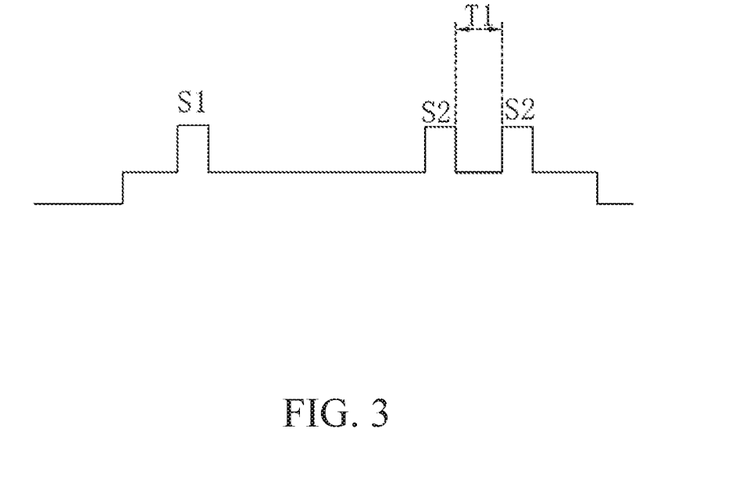
FIG. 3 is a schematic waveform diagram of a first pulse of the light-beam emitter when an operation button is continuously pressed twice according to the first embodiment of the present application.
Figure 4:
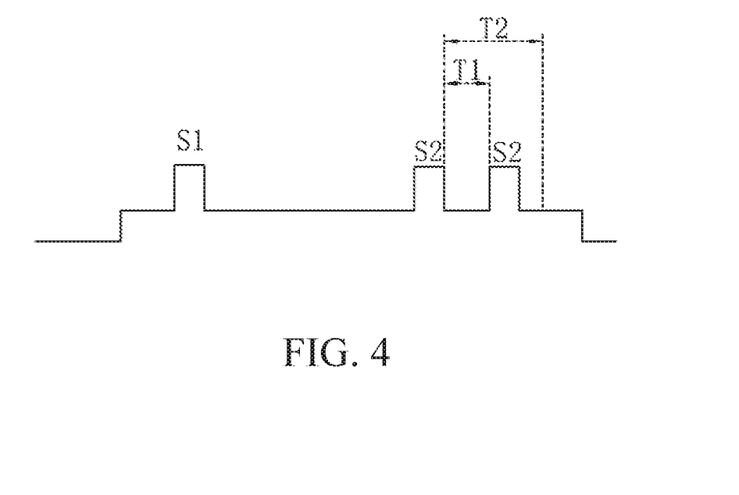
FIG. 4 is a schematic waveform diagram of a second pulse of the light-beam emitter when the operation button is continuously pressed twice according to the first embodiment of the present application.

Specifically, as shown in FIG. 3 and FIG. 4, the control assembly 13 controls the light-emitting assembly 12 to emit the second operation beam when the operation button 15 is pressed twice consecutively within the preset time as an example. When the projection button 14 is pressed, the control assembly 13 receives a projection pulse signal S1 and controls the light-emitting assembly 12 to emit the projection beam 30; when the operation button 15 is pressed, the control assembly 13 receives a control pulse signal S2 and controls the light-emitting assembly 12 to emit the operation beam.

In an embodiment, referring to FIG. 3, when the control assembly 13 receives the control pulse signal S2 only once within the preset time, the control assembly 13 controls the light-emitting assembly 12 to emit the first operation beam; the control assembly 13 receives the control pulse signal S2 twice within the preset time, the control assembly 13 controls the light-emitting assembly 12 to emit the second operation beam.

It should be noted that, in an actual implementation, the twice control pulse signals S2 received by the control assembly 13 can be same or different. When the light-emitting assembly 12 emits the second operation beam, an interval time T1 between the twice control pulse signals S2 received by the control assembly 13 is equal to or slightly less than the preset time.

In another embodiment, referring to FIG. 4, when the control assembly 13 receives the control pulse signal S2 for a first time, it enters a waiting time T2. When the control assembly 13 does not receive the control pulse signal S2 again within the waiting time T2, the control assembly 13 controls the light-emitting assembly 12 to emit the first operation beam; when the control assembly 13 receives the control pulse signal S2 for a second time within the waiting time T2, the control assembly 13 controls the light-emitting assembly 12 to emit the second operation beam.

It should be noted that the twice control pulse signals S2 received by the control assembly 13 can be same or different, and the waiting time T2 can be much less than the preset time.

Figure 5:
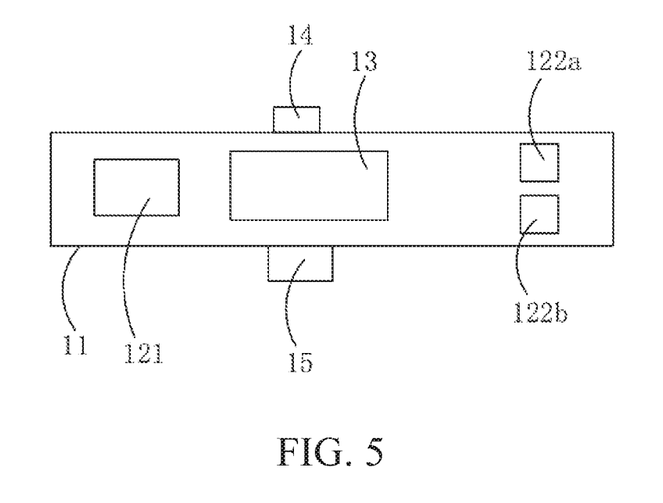
FIG. 5 is a schematic diagram of a second structure of the light-beam emitter according to the first embodiment of the present application.

Specifically, as shown in FIG. 5, a light source assembly 122 may include a first light source 122a and a second light source 122b. The first light source 122a emits the first operation beam, and the second light source 122b emits the second operation beam, so that the light-beam emitter 10 can emit the first operation beam and the second operation beam.

It should be noted that the projection beam 30 can be emitted by the first light source 122a or the second light source 122b.

Figure 6:
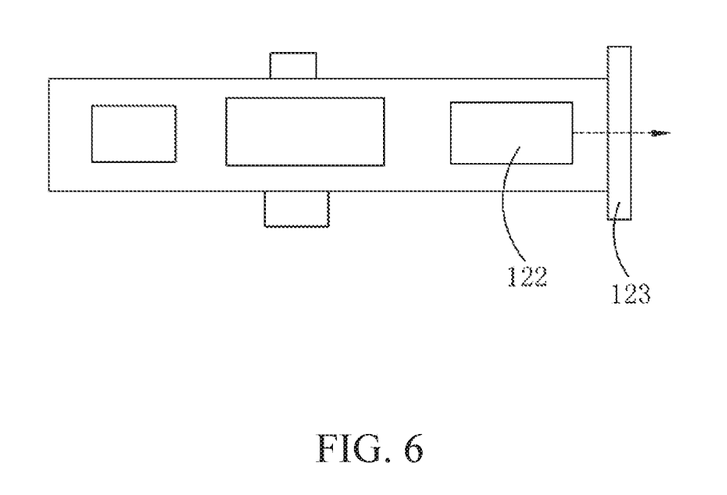
FIG. 6 is a schematic diagram of a third structure of the light-beam emitter according to the first embodiment of the present application.

It should be noted that, referring to FIG. 6, the light-beam emitter 10 may also emit the first operation beam and the second operation beam in other ways. For example, the light-emitting assembly 12 can further include a filter 123 disposed on a light-exiting side of the light source 122. The filter 123 is connected to the main body 11 by rotating around its central axis. The filter 123 is rotatably connected to the main body 11 by means of a screw connection, and the filter 123 is rotated so that the light-beam emitter 10 emits the first operation beam and the second operation beam of different intensities.

Second Embodiment

Figure 7:
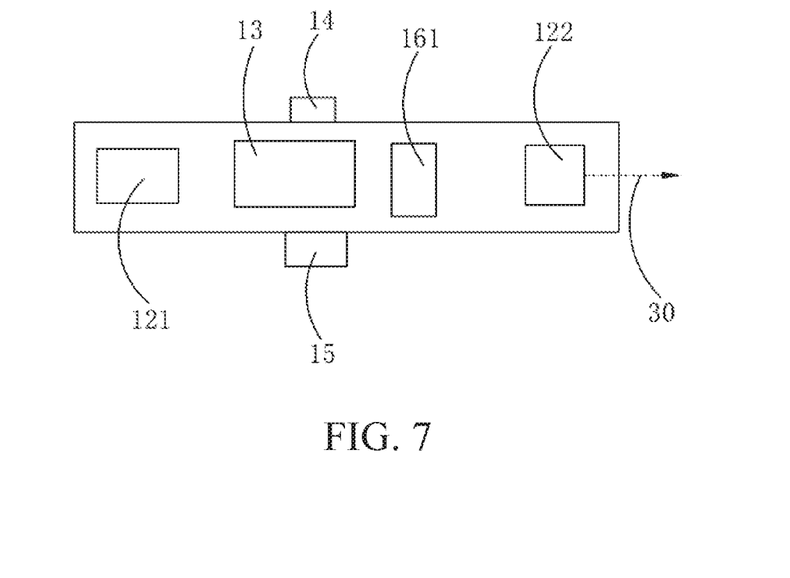
FIG. 7 is a schematic diagram of a first structure of a light-beam emitter according to a second embodiment of the present application.
Figure 8:
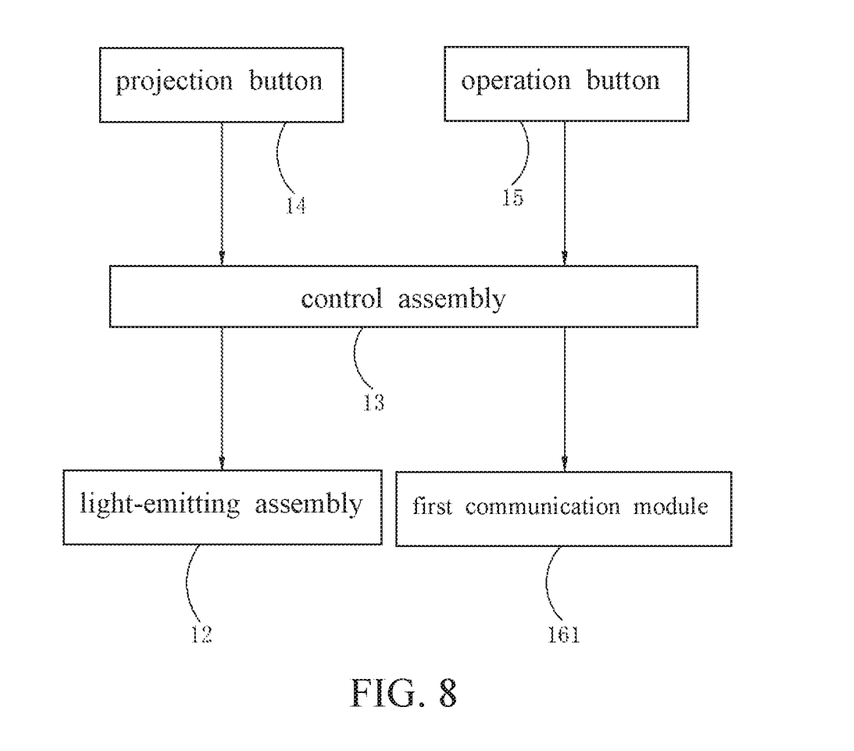
FIG. 8 is a schematic diagram of a composition module of the light-beam emitter according to the second embodiment of the present application.

A light-beam emitter, as shown in FIG. 7 and FIG. 8, differs from the first embodiment only in that the light-beam emitter 10 includes a first communication module 161 disposed on the main body 11, and the control assembly 13 is connected to the first communication module 161. The control assembly 13 is also configured to control the first communication module 161 to transmit an operation signal when the operation button 15 is pressed, and the light-beam emitter 10 transmits the operation signal to the display panel 20 through the communication module 20 to perform a corresponding operation on the display panel 20.

It should be noted that the light-beam emitter 10 can communicate with the display panel 20 through the first communication module 161. When the operation button 15 is pressed, the control assembly 13 sends a control signal to the first communication module 161 and controls the first communication module 161 to transmit an operation signal to the display panel 20, and the display panel 20 performs a corresponding operation after receiving the operation signal.

It should be noted that the first communication module 161 can be a wireless module such as a bluetooth module, an infrared module, or a wireless network module. The communication module can also be a wired connection module, that is, the light-beam emitter 10 and the display panel 20 are wired through a data transmission line or the like to realize a communication connection.

When the operation button 15 is pressed a single time within a preset time, the control assembly 13 controls the first communication module 161 to transmit a first operation signal; when the operation button 15 is continuously pressed at least twice within the preset time, the control assembly 13 controls the first communication module 161 to transmit a second operation signal, and the second operation signal is different from the first operation signal.

It should be noted that when the operation button 15 is pressed a single time and the operation button 15 is continuously pressed multiple times within a preset time, the first communication module 161 transmits the first operation signal and the second operation signal, respectively. The photosensitive device 22 on the display panel 20 performs different operations when sensing the first operation signal and the second operation signal. For example, the photosensitive device 22 performs a confirmation operation when sensing the first operation signal, and the photosensitive device 22 performs an open menu operation when sensing the second operation signal. Therefore, the light-beam emitter 10 realizes a function similar to that of a mouse, and does not require an operation plane support like a mouse pad, and the operation is simple and convenient.

It should be noted that the first operation signal is different from the second operation signal in one or more of signal intensity, wavelength, and frequency.

Figure 9:
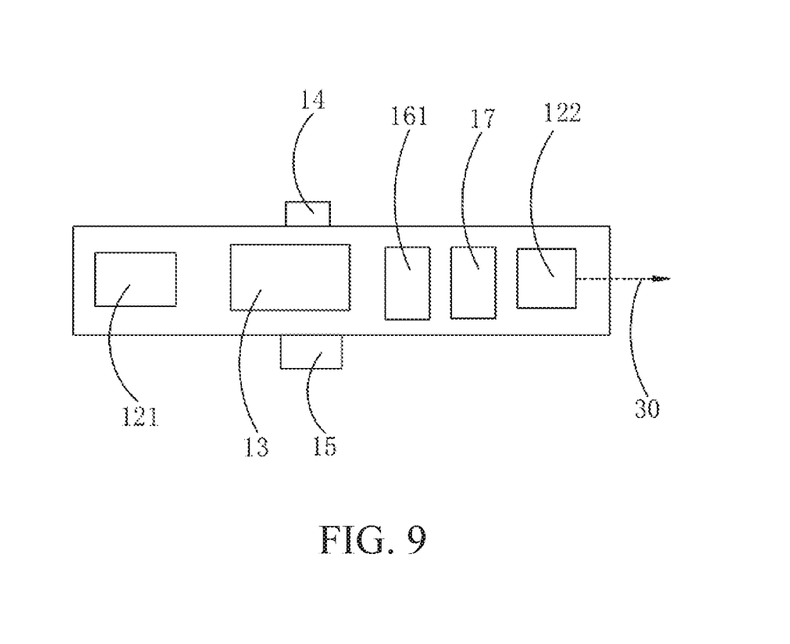
FIG. 9 is a schematic diagram of a second structure of the light-beam emitter according to the second embodiment of the present application.

Specifically, as shown in FIG. 9, the light-beam emitter 10 can further include a gyroscope positioner 17 disposed on the main body 11. The gyroscope positioner 17 is better at sensing a positional movement of the light-beam emitter 10. During the movement of the light-beam emitter 10, the gyroscope positioner 17 can play a role of assisting positioning, and solving a problem of signal acquisition speed of the light-beam emitter 10 during high-speed movement.

Third Embodiment

Figure 10:
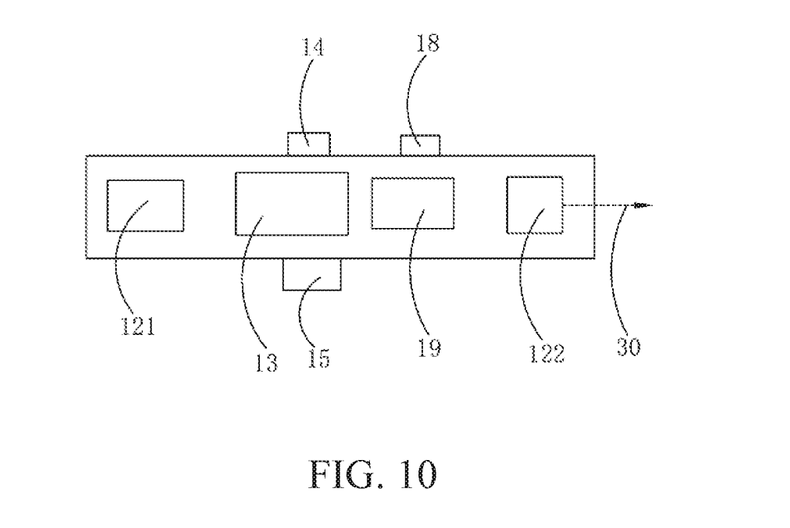
FIG. 10 is a schematic diagram of a first structure of a light-beam emitter according to a third embodiment of the present application.

A light-beam emitter, as shown in FIG. 10, is different from the first embodiment in that the light-beam emitter 10 further includes a pressure sensing button 18 and a pressure sensing assembly 19 disposed on the main body 11. The pressure sensing assembly 19 is connected to the pressure sensing button 18 and the control assembly 13, the pressure sensing assembly 19 is configured to send a pressure signal to the control assembly 13 when the pressure sensing button 18 is pressed. The control assembly 13 controls the light-beam emitter 10 to perform a corresponding operation according to the pressure signal.

It should be noted that when the pressure sensing button 18 is pressed, the control assembly 13 controls the light-beam emitter 10 to perform a corresponding operation according to the pressure signal transmitted by the pressure sensing assembly 19, so that the display panel 20 performs a corresponding operation. For example, in a scene where a line is drawn on the display panel 20 by the light-beam emitter 10, especially when lines with different sizes need to be drawn, a size of pen strokes displayed on the display panel 20 can be changed by pressing the pressure sensing button 18, thereby lines with different sizes can be drawn. Therefore, the light-beam emitter 10 can realize a pressure handwriting function similar to an active capacitor pen, and further combined with the projection button 14 and the operation button 15 at the same time, realizing more operations of the light-beam emitter 10.

Furthermore, when the pressure sensing button 18 is pressed by a first pressure, the pressure sensing assembly 19 sends a first pressure signal to the control assembly 13, and when the pressure sensing button 18 is pressed by a second pressure, the pressure sensing assembly 19 sends a second pressure signal to the control assembly 13.

It should be noted that when a pressure received by the pressure sensing button 18 is different, the pressure sensing assembly 19 sends different pressure signals to the control assembly, and the control assembly controls the light-beam emitter 10 to perform different operations according to the different pressure signals. For example, sizes of more different pen strokes can be displayed on the display panel 20.

Figure 11:
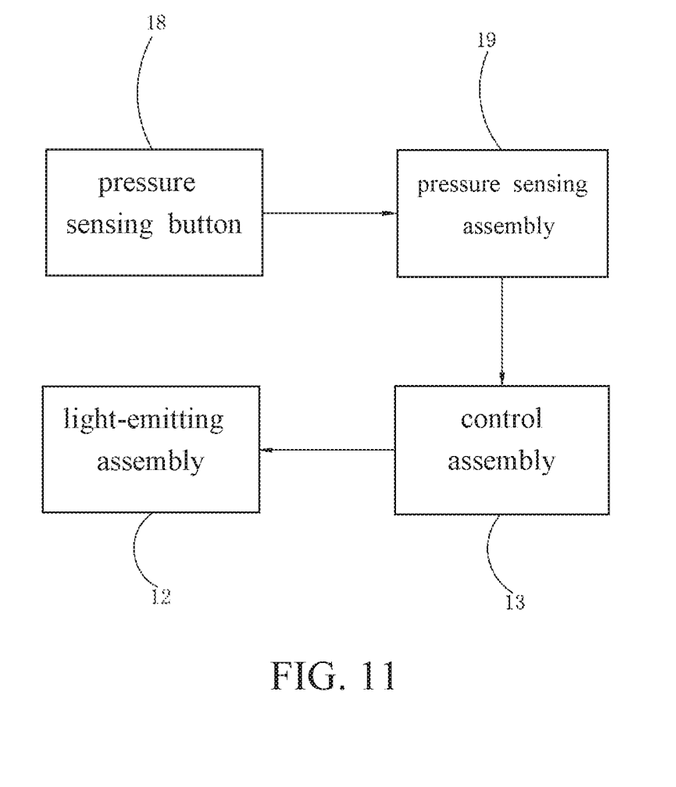
FIG. 11 is a schematic diagram of a first composition module of the light-beam emitter according to the third embodiment of the present application.

In an embodiment, as shown in FIG. 11, when the pressure sensing button 18 is pressed by the first pressure, the control assembly 13 controls the light-emitting assembly 12 to emit a third operation beam, and when the pressure sensing button 18 is pressed by the second pressure, the control assembly 13 controls the light-emitting assembly 12 to emit a fourth operation beam. The projection beam 30, the third operation beam, and the fourth operation beam are all different from each other.

It should be noted that the display panel 20 performs different operations when receiving the third operation beam and the fourth operation beam, such as displaying pen strokes with different sizes.

It should be noted that the projection beam 30, the third operation beam, and the fourth operation beam differ in one or more of intensity, wavelength, beam cross-sectional size, and frequency.

It should be noted that when the above-mentioned operation button 15 is further disposed on the main body 11, in order to prevent setting conflicts between the first operation beam and the second operation beam, and between the third operation beam and the fourth operation beam, it can be designed that a difference between the first operation beam and the second operation beam and a difference between the third operation beam and the fourth operation beam are different. For example, the difference between the first operation beam and the second operation beam lies in one or more of intensity and wavelength, the difference between the third operation beam and the fourth operation beam lies in one or more of beam cross-sectional size and frequency.

In order to prevent setting conflicts between the first operation beam and the second operation beam, and between the third operation beam and the fourth operation beam, it can also be designed that the light-beam emitter 10 performs a pressure output mode when the pressure sensing button 18 is pressed. At this time, the control assembly 13 can only receive the pressure signal sent by the pressure sensing assembly 19, and the photosensitive device 22 on the display panel 20 can only receive the third operation beam and the fourth operation beam. When a pressing of the pressure sensing button 18 is stopped, the pressure output mode is turned off, and when the operation button 15 is pressed, the light-beam emitter 10 can emit the first operation beam and the second operation beam.

Figure 12:
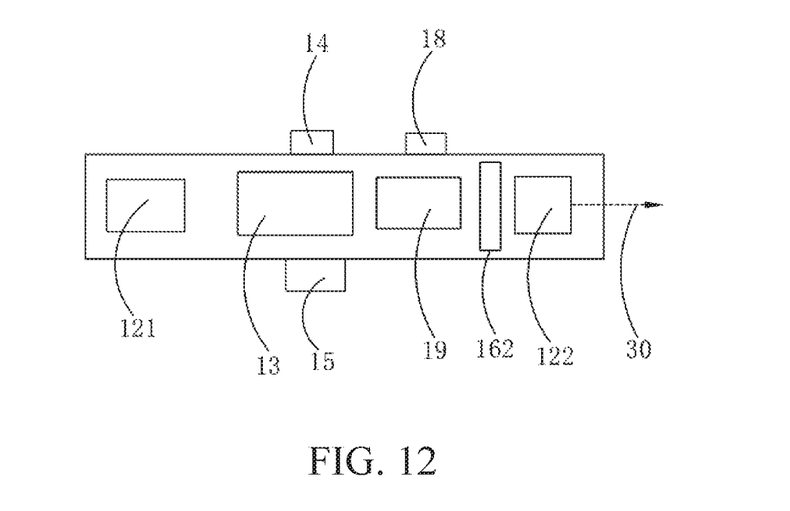
FIG. 12 is a schematic diagram of a second structure of the light-beam emitter according to the third embodiment of the present application.
Figure 13:
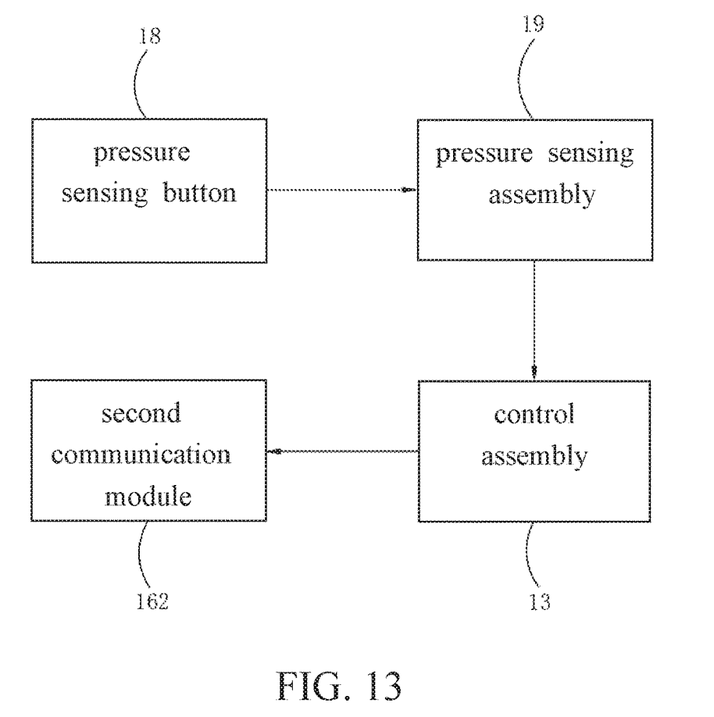
FIG. 13 is a schematic diagram of a second composition module of the light-beam emitter according to the third embodiment of the present application.

In another embodiment, as shown in FIG. 12 and FIG. 13, the light-beam emitter 10 further includes a second communication module 162 disposed on the main body 11, the second communication module and the control assembly 13 are connected to the pressure sensing assembly 19, and the control assembly 13 is configured to control the second communication module 162 to transmit an operation signal when the operation button 15 is pressed.

Wherein, when the pressure sensing button 18 is pressed by a first pressure, the control assembly 13 controls the second communication module 162 to transmit a third operation signal; when the pressure sensing button 18 is pressed by a second pressure, the control assembly 13 controls the second communication module 162 to transmit a fourth operation signal.

It should be noted that the light-beam emitter 10 can communicate with the display panel 20 through the second communication module 162. When the pressure sensing button 18 is pressed, the control assembly 13 sends a control signal to the first communication module 161 and controls the first communication module 161 transmits an operation signal to the display panel 20. The display panel 20 performs a corresponding operation after receiving the operation signal, such as changing sizes of displayed pen strokes.

It should be noted that the second communication module 162 can be a wireless module such as a bluetooth module, an infrared module, or a wireless network module. The communication module can also be a wired connection module, that is, the light-beam emitter 10 and the display panel 20 are wired through a data transmission line or the like to realize a communication connection.

Figure 14:
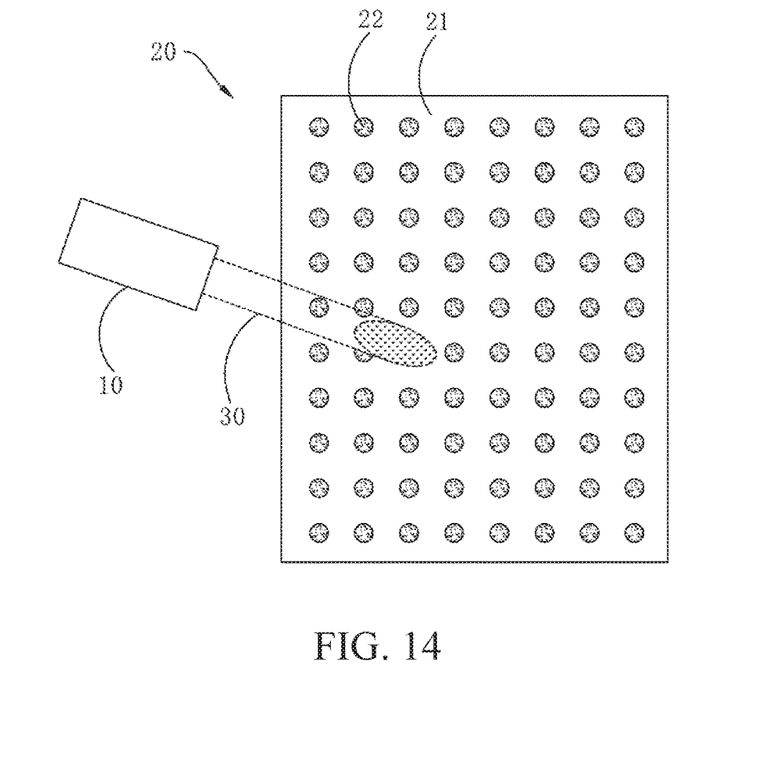
FIG. 14 is a schematic structural diagram of a display device according to an embodiment of the present application.

Based on the above-mentioned light-beam emitter 10, the present application further provides a display device. As shown in FIG. 14, the display device includes a display panel 20 and the light-beam emitter 10 as described in any of the foregoing embodiments.

Wherein, the light-beam emitter 10 emits the projection beam 30 for marking an input position on the display panel 20, and operates according to the input position marked by the projection beam 30.

Specifically, the display panel 20 includes a display screen 21 and a photosensitive device 22 for sensing a projected beam projected by the light-beam emitter 10 on the display panel 20.

When the display panel 20 needs to be operated, the projection button 14 is pressed, and the light-beam emitter 10 emits the projection beam 30. The projection beam 30 is projected onto the display panel 20 and is sensed by the photosensitive device 22 on the display panel 20, thereby after positioning a projection position of the projection beam 30 on the display panel 20, pressing the operation button 15, the light-beam emitter 10 emits an optical signal or other signals to the display panel 20, and the display panel 20 performs a corresponding operation on the projection position of the projection beam 30, for example, confirm operation, handwriting operation, drag light spot, and other operations, so as to realize the interaction between the light-beam emitter 10 and the display panel 20 conveniently and quickly.

In an embodiment, the light-beam emitter 10 includes a communication module, the display panel 20 is communicatively connected to the communication module and is configured to receive an operation signal transmitted by the communication module, and performs a corresponding operation according to the operation signal.

The beneficial effects of the present invention are follows. When you need to operate the display panel 20, press the projection button 14, the light-beam emitter 10 emits a projection beam 30, and the projection beam 30 is projected onto the display panel 20 and is sensed by the photosensitive device 22 on the display panel 20. Therefore, after positioning a projection position of the projection beam 30 on the display panel 20, press the operation button 15 and the pressure sensing button 18, the light-beam emitter 10 emits an optical signal or other signals to the display panel 20, and the display panel 20 performs a corresponding operation on the projection position of the projection beam 30, for example, confirm operation, handwriting operation, drag light spot, change pen strokes, and other operations of the display, so as to realize the interaction between the light-beam emitter 10 and the display panel 20 conveniently and quickly.

In the above embodiments, the description of each embodiment has its own emphasis. For a part that is not detailed in an embodiment, it can be referred to related descriptions in other embodiments.

The present document uses specific embodiments to explain principles and implementation of the application. Descriptions of above embodiments are only used to help understand technical solutions and core ideas of the application. A person skilled in the art can make various modifications and changes to the above embodiments without departing from the technical idea of the present invention, and such variations and modifications are intended to be within the scope of the invention.

What is claimed is:

1. A light-beam emitter, comprising:
   a main body;
   a light-emitting assembly disposed on the main body;
   a projection button and an operation button disposed on the main body; and
   a control assembly disposed on the main body;
   wherein the control assembly is connected to the projection button, the operation button, and the light-emitting assembly, the control assembly is configured to control the light-emitting assembly to emit a projection beam when the projection button is pressed, and the control assembly is configured to control the light-beam emitter to perform a corresponding operation when the operation button is pressed;
   the light-emitting assembly comprises a light source and a filter disposed on a light-exiting side of the light source, and the filter is connected to the main body by rotating around a central axis of the main body.

2. The light-beam emitter according to claim 1, wherein when the operation button is pressed, the control assembly controls the light-emitting assembly to emit an operation beam, and the projection beam is different from the operation beam.

3. The light-beam emitter according to claim 2, wherein the control assembly controls the light-emitting assembly to emit a first operation beam when the operation button is pressed a single time within a preset time, and the first operation beam is different from the projection beam.

4. The light-beam emitter according to claim 3, wherein the control assembly controls the light-emitting assembly to emit a second operation beam when the operation button is continuously pressed at least twice within the preset time, and the second operation beam, the first operation beam, and the projection beam are all different from each other.

5. The light-beam emitter according to claim 1, further comprising a first communication module disposed on the main body, wherein the control assembly is connected to the first communication module, and the control assembly is further configured to control the first communication module to transmit an operation signal when the operation button is pressed.

6. The light-beam emitter according to claim 5, wherein the control assembly controls the first communication module to transmit a first operation signal when the operation button is pressed a single time within a preset time; and when the operation button is continuously pressed at least twice within the preset time, the control assembly controls the first communication module to transmit a second operation signal, and the second operation signal is different from the first operation signal.

7. The light-beam emitter according to claim 5, further comprising a gyroscope positioner disposed on the main body.

8. The light-beam emitter according to claim 1, further comprising a pressure sensing button and a pressure sensing assembly disposed on the main body, wherein the pressure sensing assembly and the pressure sensing button are connected to the control assembly, the pressure sensing assembly is configured to deliver a pressure signal to the control assembly when the pressure sensing button is pressed, and the control assembly controls the light-beam emitter to perform the corresponding operation according to the pressure signal.

9. The light-beam emitter according to claim 8, wherein the pressure sensing assembly sends a first pressure signal to the control assembly when the pressure sensing button is pressed by a first pressure, and the pressure sensing assembly sends a second pressure signal to the control assembly when the sensing button is pressed by a second pressure.

10. The light-beam emitter according to claim 9, wherein the control assembly controls the light-emitting assembly to emit a third operation beam when the pressure sensing button is pressed by the first pressure, the control assembly controls the light-emitting assembly to emit a fourth operation beam when the pressure sensing button is pressed by the second pressure, and the projection beam, the third operation beam, and the fourth operation beam are all different from each other.

11. The light-beam emitter according to claim 9, further comprising a second communication module disposed on the main body, wherein the second communication module and the control assembly are connected to the pressure sensing assembly, the control assembly is configured to control the second communication module to transmit an operation signal when the operation button is pressed; and
   wherein the control assembly controls the second communication module to transmit a third operation signal when the pressure sensing button is pressed by the first pressure, and the control assembly controls the second communication module to transmit a fourth operation signal when the pressure sensing button is pressed by the second pressure.

12. A display device, comprising a display panel and a light-beam emitter, wherein the display panel comprises a display screen and a photosensitive device configured to sense a projected beam projected on the display panel by the light-beam emitter, wherein the light-beam emitter comprises:
- a main body;
- a light-emitting assembly disposed on the main body;
- a projection button and an operation button disposed on the main body; and
- a control assembly disposed on the main body;
- wherein the control assembly is connected to the projection button, the operation button, and the light-emitting assembly, the control assembly is configured to control the light-emitting assembly to emit a projection beam when the projection button is pressed, and the control assembly is configured to control the light-beam emitter to perform a corresponding operation when the operation button is pressed;
- the light-emitting assembly comprises a light source and a filter disposed on a light-exiting side of the light source, and the filter is connected to the main body by rotating around a central axis of the main body.

13. The display device according to claim 12, wherein the light-beam emitter comprises a communication module, the display panel is communicatively connected to the communication module and is configured to receive an operation signal transmitted by the communication module, and performs a corresponding operation according to the operation signal.

14. The display device according to claim 12, wherein when the operation button is pressed, the control assembly controls the light-emitting assembly to emit an operation beam, and the projection beam is different from the operation beam.

15. The display device according to claim 14, wherein the projection beam is different from the operation beam in one or more of intensity, wavelength, beam cross-sectional size, and frequency.

16. The display device according to claim 14, wherein the control assembly controls the light-emitting assembly to emit a first operation beam when the operation button is pressed a single time within a preset time, and the first operation beam is different from the projection beam.

17. The display device according to claim 16, wherein the control assembly controls the light-emitting assembly to emit a second operation beam when the operation button is continuously pressed at least twice within the preset time, and the second operation beam, the first operation beam, and the projection beam are all different from each other.

* * * * *